(12) United States Patent
Noviello

(10) Patent No.: US 7,747,498 B2
(45) Date of Patent: *Jun. 29, 2010

(54) TRADING ORDERS WITH DECAYING RESERVES

(75) Inventor: Joseph C. Noviello, New York, NY (US)

(73) Assignee: BGC Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,544

(22) Filed: Oct. 21, 2009

(65) Prior Publication Data

US 2010/0049648 A1 Feb. 25, 2010

Related U.S. Application Data

(63) Continuation-in-part of application No. 12/106,494, filed on Apr. 21, 2008.

(51) Int. Cl.
G06Q 40/00 (2006.01)
(52) U.S. Cl. .................................................. 705/35
(58) Field of Classification Search ................ 235/385; 370/352; 396/60; 700/231, 235; 704/246; 705/30–45; 709/224; 718/106; 725/146
See application file for complete search history.

(56) References Cited

U.S. PATENT DOCUMENTS

| | | | | |
|---|---|---|---|---|
| 2002/0178104 | A1* | 11/2002 | Hausman | 705/37 |
| 2003/0126065 | A1 | 7/2003 | Eng et al. | |
| 2004/0143538 | A1* | 7/2004 | Korhammer et al. | 705/37 |
| 2004/0215538 | A1 | 10/2004 | Smith et al. | |
| 2005/0075963 | A1 | 4/2005 | Balabon | |
| 2005/0108125 | A1* | 5/2005 | Goodwin et al. | 705/35 |
| 2006/0026090 | A1* | 2/2006 | Balabon | 705/37 |
| 2006/0136318 | A1* | 6/2006 | Rafieyan et al. | 705/37 |
| 2007/0130050 | A1 | 6/2007 | Claus et al. | |
| 2007/0143203 | A1 | 6/2007 | Claus et al. | |
| 2007/0143204 | A1 | 6/2007 | Claus et al. | |
| 2009/0018944 | A1 | 1/2009 | De Verdier | |
| 2009/0265282 | A1 | 10/2009 | Noviello | |

OTHER PUBLICATIONS

Automated System for Routing Orders for Financial Instruments, Lava Trading Inc, May 20, 2003.*
U.S. Appl. No. 12/685,999, filed Jan. 12, 2010, Noviello.
USPTO Notice of Allowance for U.S. Appl. No. 12/106,494, filed Oct. 29, 2009 (25 pages).

(Continued)

*Primary Examiner*—Mary Cheung
*Assistant Examiner*—Tien C Nguyen

(57) ABSTRACT

In various embodiments, an apparatus includes a processor and a memory. The memory is communicatively coupled to the processor. The memory stores software instructions that, when executed by the processor, cause the processor to receive a trading order for a particular quantity of a trading product. The trading order specifies that a first portion of the particular quantity is a displayed quantity and that a second portion of the particular quantity is a reserved quantity. The trading order specifies at least one of a decay rule, a decay interval, a decay rate, decay quantity, and one or more conditions. The software instructions, when executed by the processor, cause the processor to cause the reserved quantity to decay based at least in part on at least one of the decay rule, the decay interval, the decay rate, and the decay quantity, and one or more conditions.

29 Claims, 4 Drawing Sheets

OTHER PUBLICATIONS

Market Structure Massacre? Marks, Jim, Traders Magazine pp.26, Mar. 1, 2002 (2 pages).

Townsend Analytics, Ltd. Releases New Version of RealTick(™), PR Newswire, p NA, Oct. 16, 2000 (3 pages).

Notification of Transmittal of the International Search Report and the Written Opinion of the International Searching Authority, or the Declaration for International Application No. PCT/US09/41131; 9 pages; Date: May 19, 2009.

USPTO Office Action for U.S. Appl. No. 12/106,494, filed Apr. 3, 2009 (8 pages).

USPTO Examiner Interview Summary for U.S. Appl. No. 12/106,494, filed Jul. 31, 2009 (2 pages).

* cited by examiner

DECAY RULE: REDUCE RESERVED QUANTITY BY 20,000,000 UNITS/MINUTE — 72

| TIME | TRADING ORDER | TRADING PRODUCT | TOTAL QUANTITY | PRICE PER UNIT | DISPLAYED QUANTITY | RESERVED QUANTITY |
|---|---|---|---|---|---|---|
| 10:26:02 | BID A | SECURITY X | 100,000,000 | $2.00 | 10,000,000 | 90,000,000 |
| 10:27:02 | BID A | SECURITY X | 90,000,000 | $2.00 | 10,000,000 | 80,000,000 |
| 10:28:02 | BID A | SECURITY X | 70,000,000 | $2.00 | 10,000,000 | 60,000,000 |
| 10:29:02 | BID A | SECURITY X | 50,000,000 | $2.00 | 10,000,000 | 40,000,000 |
| 10:30:02 | BID A | SECURITY X | 30,000,000 | $2.00 | 10,000,000 | 20,000,000 |
|  | BID A | SECURITY X | 10,000,000 | $2.00 | 10,000,000 | 0 |

— 66

| TIME | COUNTERORDER | TRADING PRODUCT | QUANTITY | PRICE |
|---|---|---|---|---|
| 10:26:34 | OFFER B | SECURITY X | 10,000,000 | $2.00 |

DECAY RULE: REDUCE RESERVED QUANTITY AT RATE OF 10T (T = ELAPSED MINUTES SINCE RECEIPT OF ORDER)

| TIME | TRADING ORDER | TRADING PRODUCT | TOTAL QUANTITY | DISPLAYED QUANTITY | RESERVED QUANTITY |
|---|---|---|---|---|---|
| 11:42:12 | BID A | SECURITY Y | 100 | 10 | 90 |
| 11:43:12 | BID A | SECURITY Y | 90 | 10 | 80 |
| 11:44:12 | BID A | SECURITY Y | 70 | 10 | 60 |
| 11:45:12 | BID A | SECURITY Y | 40 | 10 | 30 |
| 11:46:12 | BID A | SECURITY Y | 10 | 10 | 0 |

TRADING ORDERS WITH DECAYING RESERVES

CROSS REFERENCE TO RELATED APPLICATION

This patent application is a continuation-in-part application of U.S. patent application Ser. No. 12/106,494, filed Apr. 21, 2008, which is hereby incorporated by reference herein in its entirety.

BRIEF DESCRIPTION OF THE FIGURES

FIG. 2 illustrates decay of a trading order with a reserved quantity, according to certain embodiments.

FIG. 3 illustrates decay of a trading order with a reserved quantity, according to certain embodiments.

DETAILED DESCRIPTION

Figure 1:
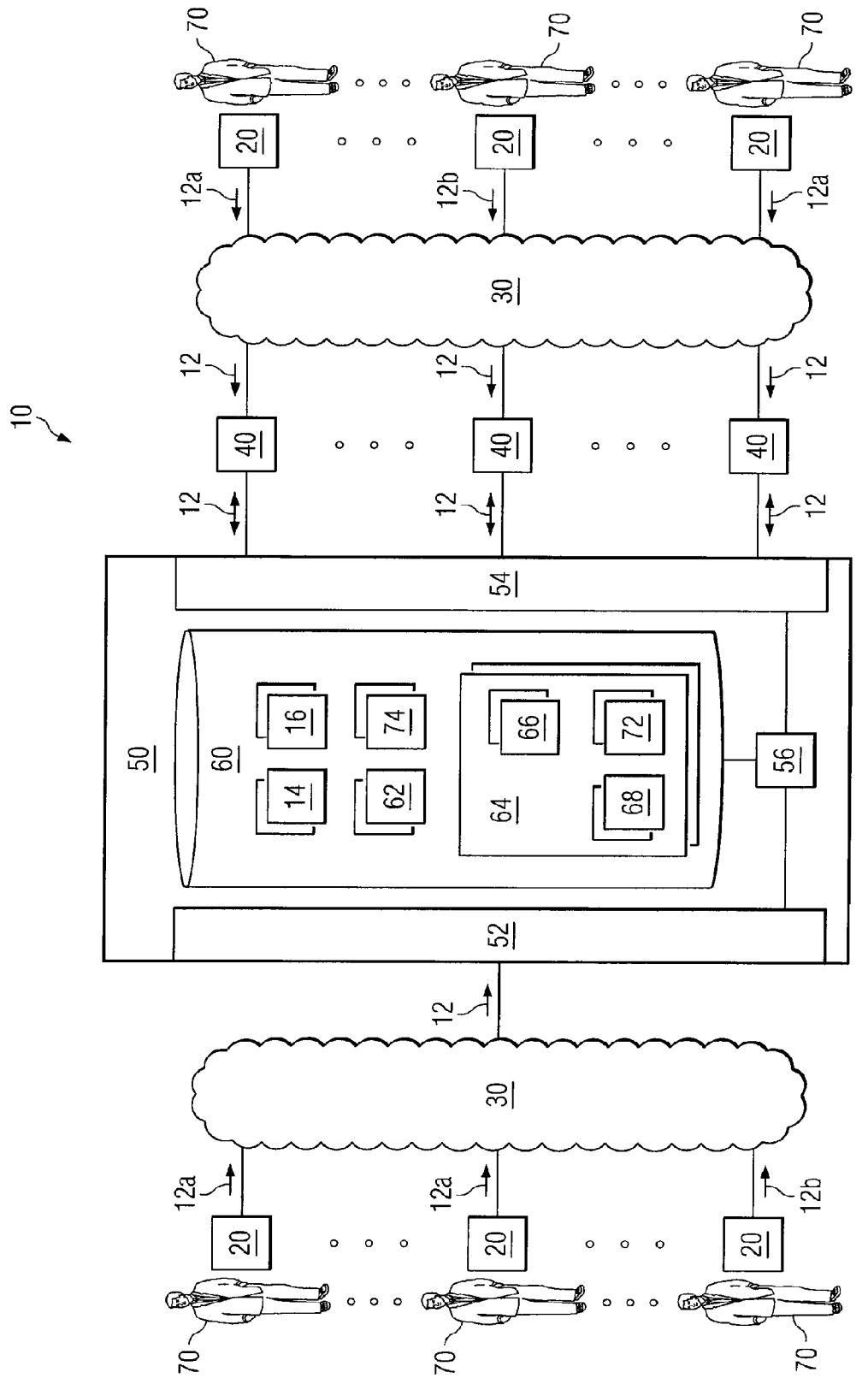
FIG. 1 illustrates a system according to at least one embodiment of the systems disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are Not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications.

Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiments are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth☐, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. §112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

In some embodiments, a system comprises a memory operable to store a trading order for a particular quantity of a trading product, wherein a first portion of the particular quantity is a displayed quantity and a second portion of the particular quantity is a reserved quantity. The system further comprises a processor communicatively coupled to the memory and operable to disclose the displayed quantity to one or more market centers. The processor is further operable to identify a decay rate associated with the trading order. The processor is further operable to cause the reserved quantity to decay based at least in part on the identified decay rate.

Various embodiments of the present disclosure may benefit from numerous advantages. It should be noted that one or more embodiments may benefit from some, none, or all of the advantages discussed below.

One advantage is that a trading system may allow a trader to submit a trading order comprising a displayed quantity and a reserved quantity. The trading system may disclose the displayed quantity to multiple market centers while preventing the disclosure of the reserved quantity. In some embodiment, the trading system causes the reserved quantity of the trading order to decay over time. The trading system may thereby reduce certain risks associated with market volatility. In particular, by causing the reserved quantity to decay, the trading system may reduce the trader's risk of having exposure for a stale trading order with a price that is no longer favorable for the trader.

Another advantage is that, by causing the reserved quantity of trading order to decay, the trading system may improve system efficiency. In particular, as trading orders with reserved quantities are not aggressed, trading system may gradually delete the reserved quantities of such trading orders from one or more order books. Deleting portions of such trading orders may free up memory and processing resources in the trading system. Trading system may thereby improve data throughput and/or conserve system resources.

A system comprises a memory operable to store a trading order for a particular quantity of a trading product, wherein a first portion of the particular quantity is a displayed quantity and a second portion of the particular quantity is a reserved quantity. The system further comprises a processor communicatively coupled to the memory and operable to disclose the displayed quantity to one or more market centers. The processor is further operable to identify a decay rate associated with the trading order. The processor is further operable to cause the reserved quantity to decay based at least in part on the identified decay rate.

FIG. 1 illustrates one embodiment of a trading system 10. Generally, trading system 10 comprises a trading platform 50 communicatively coupled to clients 20, networks 30, and market centers 40. Trading platform 50 may receive and process trading orders 12 from traders 70. In some embodiments, trading platform 50 may cause a portion of trading order 12 to decay over time. Trading platform 50 may thereby reduce certain risks associated with market volatility. In particular, by causing a portion of trading order 12 to decay, trading platform 50 may reduce the risks of having exposure to a stale trading order 12 with a price that has become unfavorable.

A given trading order 12 may comprise two parts—a "displayed quantity" and a "reserved quantity." In placing trading order 12, trader 70 may indicate that only a portion of the total quantity of trading order 12 should be displayed to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while only displaying a portion of that trading order 12 to other traders 70. Trading platform 50 may incrementally fill a particular trading order 12 by first filling the displayed quantity of that trading order 12 and then using the reserved quantity to replenish the displayed quantity of that trading order 12.

Trading orders 12 generally comprise orders 12a and counterorders 12b. Orders 12a and counterorders 12b may be buy orders 14 and sell orders 16. Orders 12a and counterorders 12b are complementary actions such as, for example, buying and selling. If an order 12a refers to a buy order 14, then a counterorder 12b refers to a sell order 16. Conversely, if an order 12a refers to a sell order 16, then a counterorder 12b refers to a buy order 14. A buy order 14 is a request to buy a particular quantity of a particular trading product (e.g., bid request). A sell order 16 is a request to sell a particular quantity of a particular trading product (e.g., offer request). In particular embodiments, trading order 12 may specify a target price (e.g., target bid price or target offer price) for the trading product. Although system 10 is exemplified below using equities as the trading product, the trading product that forms the basis of trading order 12 may comprise any type of goods, services, financial instruments, commodities, any other suitable product or combination of products. Examples of financial instruments include, but are not limited to, stocks, bonds, futures contracts, fixed income securities, interest rate derivatives, currencies, debentures, options, securities, derivative trading instruments, etc.

Clients 20 are operable to receive trading orders 12 from traders 70 and to send trading orders 12 to trading platform 50 and/or market centers 40. Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keypad, keyboard, touch screen, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10.

According to certain embodiments, traders 70 may include market makers. A market maker may include any individual or firm that submits and/or maintains either or both bid and offer trading orders 12 simultaneously for the same instrument. For example, a market maker may include an individual or firm, such as a brokerage or bank, that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

Networks 30 are communication platforms operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may comprise any combination of local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40.

Market centers 40 comprise all manner of order execution venues including exchanges, Electronic Communication Networks (ECNs), Alternative Trading Systems (ATSs), market makers, or any other suitable market participants. Each market center 40 maintains a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Different market centers 40 may have different policies regarding the disclosure of various details of trading orders 12. For example, certain market centers 40 referred to as "cooperative" market centers may disclose both the displayed quantities and the reserved quantities of trading orders 12 to trading platform 50. Other market centers 40 referred to as "non-cooperative" market centers may disclose only the displayed quantities of trading orders 12 to trading platform 50.

Trading platform 50 is a trading architecture that facilitates the routing, matching, and otherwise processing of trading orders 12. Trading platform 50 may comprise a management center or a headquartering office for any person, business, or entity that seeks to route, allocate, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Client interface 52 of trading platform 50 is communicatively coupled to network 30 and supports communications between clients 20 and the various components of trading platform 50. According to certain embodiments, client interface 52 comprises a transaction server that receives trading orders 12 communicated by clients 20 via network 30.

Market interface 54 is communicatively coupled to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 connected directly to trading platform 50.

Client interface 52 and market interface 54 are communicatively coupled to processor 56. Processor 56 is operable to record trading orders 12 in memory module 60 and route trading orders 12 to market centers 40. Processor 56 is further operable to execute logic 62 stored in memory module 60 to match buy orders 14 and sell orders 16 received by client interface 52 and market interface 54. In addition, processor 56 is operable to incrementally fill a particular trading order 12 by using the reserved quantity of that trading order 12 to replenish the displayed quantity of that trading order 12. In some embodiments, processor 56 may cause the reserved quantity of trading order 12 to decay over time. Processor 56 may comprise any suitable combination of hardware and software implemented in one or more modules to provide the described function or operation.

For example, processor 56 may cause the reserved quantity of trading order 12 to decay over time in accordance with decay rule 66. Decay rule 66 may be stored in memory module 60. The trading order 12 may include decay rule 66. Decay rule 66 may be embedded within trading order 12. Decay rule 66 may be part of a data signal that includes trading order 12. Processor 56 may retrieve decay rule 66 from the trading order 12 and store decay rule 66 in memory module 60. Processor 56 may process trading order 12 and decay rule 66 (e.g., included in trading order 12) without storing decay rule 66 in memory module 60.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12.

Although FIG. 1 illustrates memory module 60 as internal to trading platform 50, it should be understood that memory module 60 may be internal or external to components of trading system 10, depending on particular implementations. Also, memory module 60 illustrated in FIG. 1 may be separate or integral to other memory devices to achieve any suitable arrangement of memory devices for use in trading system 10.

According to certain embodiments, memory module 60 stores logic 62 and trader profiles 64. Logic 62 generally comprises software instructions for routing, matching, processing, or filling trading orders 12. Processor 56 is operable to execute logic 62 in memory module 60 to match buy orders 14 and sell orders 16 and to determine the priority of traders 70 associated with those buy orders 14 and sell orders 16.

Memory module 60 may store a respective trader profile 64 for each trader 70 in trading system 10. Trader profile 64 for a particular trader 70 may comprise the name, account information, trading preferences, trade history, and/or other suitable information associated with the particular trader 70. In some embodiments, trader profile 64 comprises one or more decay rules 66.

The trading order 12 may include decay rule 66. Decay rule 66 may be embedded within trading order 12. Decay rule 66 may be part of a data signal that includes trading order 12. A trading order 12 may include one or more decay rules 66.

Processor 56 may execute decay rule 66 (e.g., stored in memory module 60 and/or specified by trading order 12 as described above) to determine the rate and/or frequency at which to reduce the reserved quantity of trading order 12. Decay rule 66 may specify an amount by which the reserved quantity of trading order 12 should decay over time. For example, decay rule 66 may direct processor to reduce the reserved quantity of trading order 12 by one thousand units per minute. By reducing the reserved quantity of trading order 12 over time, processor may reduce the risks associated with having a stale trading order 12 in a volatile market. In some embodiments, a particular decay rule 66 may be associated with a decay interval 68 and a decay rate 72 (described below with respect to FIG. 2).

It should be understood that the internal structure of trading platform 50 and the interfaces, processors, and memory devices associated therewith is malleable and can be readily changed, modified, rearranged, or reconfigured in order to achieve the intended operations of trading platform 50.

In operation, trading platform 50 is operable to receive trading order 12 from client 20. Trading order 12 may be for a particular quantity of a particular trading product (e.g., equities, commodities, futures, currencies, bonds, and so forth). In some embodiments, trading order 12 designates a portion of the particular quantity as a displayed quantity. Trading order 12 may designate another portion of the particular quantity of trading order 12 as the reserved quantity. Trading platform 50 may disclose the displayed quantity of trading order 12 to market center 40. In some embodiments, trading platform 50 prevents the disclosure of the reserved quantity of trading order 12 to market center 40.

Upon receiving trading order 12, processor 56 may identify decay rule 66 stored in memory module 60. Decay rule 66 may instruct processor 56 to reduce the reserved quantity of trading order 12 over time. Reducing the reserved quantity of trading order 12 may comprise deleting a portion of trading order 12 from one or more order books 74 in memory module 60. In some embodiments, the reduction of the reserved quantity of trading order 12 is based at least in part on decay rate 72 associated with decay rule 66.

In addition to specifying displayed and reserved quantities of a particular trading product, trading order 12 (or, e.g., a data signal that includes or accompanies trading order 12) may specify a decay rule 66. Thus, the trading order 12 may include decay rule 66. Decay rule 66 may be embedded within trading order 12. Trading order 12 may store decay rule 66. Decay rule 66 may be part of a data signal that includes trading order 12. A trading order 12 may include one or more decay rules 66.

The decay rule 66 (e.g., included in trading order 12) may specify, e.g., a decay interval, a decay rate, and/or a decay quantity. The trading order 12 may specify, e.g., a decay interval, decay rate, and/or a decay quantity in addition to a decay rule 66.

Although decay rule(s) 66, decay interval(s) 68, and decay rate(s) 72 are shown in FIG. 1 as being stored in the trading platform 50 in memory module 60, any of decay rule(s) 66, decay interval(s) 68, and decay rate(s) 72, etc., may be included in trading order 12. Any subsequent description of, e.g., processor 56 retrieving a decay rule 66 from memory module 60 is merely an example, and processor 56 may instead, or in addition, retrieve a decay rule 66 from trading order 12.

Thus, upon receiving trading order 12, processor 56 may identify decay rule 66 stored in memory module 60. Upon receiving trading order 12, processor 56 may retrieve, e.g., decay rule 66 from trading order 12. Processor 56 may store, e.g., decay rule 66 in memory module 60. Processor 56 may update decay rule 66 in memory module 60 based on a decay rule stored in trading order 12. Upon receiving trading order 12, processor 56 may process trading order 12 and, e.g., any associated decay rule 66 without storing, e.g., the decay rule 66 in memory module 60.

In some embodiments, upon receiving trading order 12, processor 56 may retrieve a decay rule 66 from memory module 60 and may retrieve specific values or inputs, e.g., any of a decay interval, a decay rate, a decay quantity, etc., from trading order 12. That is, trading order 12 may include a particular value of decay interval 68, decay rate 72, and/or a decay quantity. Processor 56 may receive the trading order 12 and may retrieve one or more specific values (e.g., decay rate 72) from trading order 12, and execute a decay rule 66 stored in memory module 60 using these values.

FIG. 2 is a table 200 that sets forth an example illustrating the decay of trading order 12, according to certain embodiments. In this example, one or more decay rules 66 (e.g., stored in memory module 60 and/or specified by trading order 12 as described above) cause the reserved quantity of trading order 12 to decay over time. As each successive interval of time expires, processor 56 may reduce the reserved quantity of trading order 12 by a configurable increment. The time intervals at which the reserved quantity decays may be referred to as decay intervals 68. The rate at which the reserved quantity decays may be referred to as decay rate 72. For example, decay rule 66 may specify that, at the expiration of each successive minute after trading platform 50 receives trading order 12, processor 56 reduces reserved quantity of trading order 12 by five million units. In this example, decay interval 68 is one minute and decay rate 72 is five million units/minute. Although the foregoing example illustrates decay interval 68 of one minute, it should be understood that decay interval 68 may be ten seconds, two minutes, ten minutes, and/or any suitable interval of time. Although the foregoing example illustrates decay rate 72 of five million units/minute, it should be understood that decay rate 72 may be one hundred units/second, one million units/minute, and/or any suitable rate.

In some embodiments, once processor 56 uses counterorder 12b to fill the displayed quantity of order 12a, processor 56 may replenish the displayed quantity of order 12a. In particular, processor 56 may be configured to use a portion of the reserved quantity of order 12a to replenish the displayed quantity of order 12a. In some embodiments, the filling and replenishing of the displayed quantity of order 12a occurs independently of the decay of the reserved quantity of order 12a.

The example order 12a in table 200 illustrates certain embodiments. In this example, trading platform 50 comprises decay rule 66 (and/or, e.g., trading order 12 specifies decay rule 66) to reduce the reserved quantity of trading order 12 by twenty million units per minute. In this example, at 10:26:02 a.m., trading platform 50 receives Bid A from Trader A. Bid A is for one hundred million units of Security X at a price of two dollars per unit. The trading product and price associated with Bid A is illustrated in columns 202 and 204, respectively. Bid A has a displayed quantity of ten million units and a reserved quantity of ninety million units. The displayed quantity and reserved quantity of Bid A is illustrated in columns 206 and 208, respectively.

Upon receiving Bid A, processor 56 discloses the displayed quantity (i.e., ten million units) of Bid A to market centers 40. At 10:26:34 a.m., trading platform 50 receives Offer B, a matching counterorder 12b. Offer B is for ten million units of Security X at two dollars per unit. Upon receiving Offer B, processor 56 uses the ten million units from Offer B to fill the displayed quantity of Bid A. Processor 56 then uses ten million units from the reserved quantity of Bid A to replenish the displayed quantity of Bid A. Thus, the reserved quantity of Bid A becomes eighty million units.

In this example, trading platform 50 does not receive any other matching counterorders 12b prior to 10:27:02 a.m.— one minute after trading platform 50 received Bid A. According to decay rule 66, at 10:27:02 a.m., processor 56 reduces reserved quantity of Bid A from eighty million units to sixty million units. With the expiration of each successive minute, processor 56 continues to reduce reserved quantity of Bid A according to decay rule 66. By decaying the reserved quantity of Bid A over time, processor 56 may reduce certain risks associated with market volatility. In particular, by reducing the reserved quantity of Bid A over time, processor 56 may reduce the risk of Trader A having exposure for a stale trading order 12 with a price that is no longer favorable for Trader A.

In some embodiments, trading platform 50 may comprise different decay rules 66 for different traders 70. In particular, memory module 60 may store a respective trader profile 64 for each trader 70 in trading system 10. Trader profile 64 for a particular trader 70 may comprise one or more decay rules 66 that are configurable by that trader 70. In some embodiments, a particular trader profile 64 may comprise a first decay rule 66 for a first trading product, a second decay rule 66 for a second trading product, and so forth. Thus, a particular trader 70 may cause the reserved quantity of trading order 12 for a first trading product to decay at a different rate than the reserved quantity of trading order 12 for a second trading product. In some embodiments, upon receiving trading order 12, processor 56 identifies the particular trader 70 that submitted trading order 12. Processor 56 may then identify in memory module 60 trader profile 64 associated with the particular trader 70. Processor 56 may then retrieve the appropriate decay rule 66 from the identified trader profile 64. Thus, processor 56 may apply different decay rules 66 for different traders 70. Processor 56 may update a decay rule 66 included in a trader profile 64 based on a decay rule 66 from a received trading order 12.

Although decay rule(s) 66, decay interval(s) 68, and decay rate(s) 72 are shown in FIG. 1 as being stored in the trading platform 50 in memory module 60, any of decay rule(s) 66, decay interval(s) 68, and decay rate(s) 72, etc., may be included in trading order 12. Trading order 12 for a particular trading product may include, e.g., one or more decay rules 66 (and/or decay intervals, decay rates, decay quantities, etc.) associated with the particular trading product (or, e.g., any trading products that are related to the particular trading product). Trading order 12 originating from a particular trader may include, e.g., one or more decay rules 66 (and/or decay intervals, decay rates, decay quantities, etc.) associated with the particular trader (e.g., based on preferences of the particular trader).

In some embodiments, decay rule 66 may specify an initial decay interval 68 that is longer or shorter than successive decay intervals 68. For example, a particular decay rule 66 may specify that, five minutes after trading platform 50 received trading order 12, processor 56 begins decaying the reserved quantity of trading order 12. After the initial five minute interval, the particular decay rule 66 may specify that processor 56 continue to decay the reserved quantity after each successive minute.

Decay rule 66 may comprise any suitable formula, table, algorithm, and/or instructions for reducing the reserved quantity of trading order 12. In some embodiments, decay rule 66 may comprise a formula for a variable decay rate 72. For example, decay rule 66 may be a formula for an exponentially increasing decay rate 72.

FIG. 3 is a table 300 that sets forth an example illustrating variable rate decay of trading order 12, according to certain embodiments. In this example, decay rule 66 (e.g., stored in memory module 60 and/or specified by trading order 12 as described above) instructs processor 56 to decay the reserved quantity of trading order 12 at a rate of "10 T" where "T" is the number of minutes since trading platform 50 received trading order 12. At 11:42:12 a.m., trading platform 50 receives Bid A for one hundred units of Security Y. Bid A comprises a displayed quantity of ten units and a reserved quantity of ninety units. The trading product, displayed quantity, and reserved quantity associated with Bid A are illustrated in columns 302, 304, and 306, respectively.

In this example, processor 56 reduces the reserved quantity of Bid A according to decay rule 66. In particular, at 11:43:12 a.m., processor 56 reduces the reserved quantity of Bid A by ten units (i.e., 10×1). At 11:44:12 a.m., processor 56 further reduces the reserved quantity of Bid A by twenty units (i.e., 10×2). With each successive minute, processor 56 reduces the reserved quantity of Bid A by an increasing amount according to decay rule 66. The decay of the reserved quantity may continue until the reserved quantity is eliminated. Thus, decay rule 66 may specify a variable decay rate 72.

Although the foregoing example illustrates decay rate 72 associated with a particular formula, it should be understood that decay rule 66 may comprise any suitable formula, table, algorithm, and/or instructions for reducing the reserved quantity of trading order 12 over time.

For example, in some embodiments, decay rule 66 is configured to cause the reserved quantity of trading order 12 to decay over time in response to one or more conditions.

Trading order 12 may specify decay rule 66 which may in turn specify the one or more conditions as well as, e.g., a decay interval, a decay rate, and/or a decay quantity, etc.

For example, for a trading order 12 for a particular trading product, a condition may relate to a market price of the particular trading product. For example, if the market price goes below (or, e.g., above) a certain value, then the reserved quantity (of the particular trading product) specified by trading order 12 should decay at, e.g., a particular decay rate 72 embedded in the trading order 12.

The condition may relate to market activity external to the particular trading product of a trading order 12. For example, the condition might involve a market index such as the Dow Jones Industrial Average. For example, if the Dow Jones Industrial Average goes below (or, e.g., above) a certain value, then the reserved quantity of trading order 12 should decay, e.g., according to a particular decay interval 68 and decay quantity specified by the trading order 12.

The condition may relate to market activity external to, but more directly related to the particular trading product of a trading order 12. For example, if the trading order concerns a bid/offer for the particular trading product in a cash market, the condition might involve a bid/offer for a derivative financial instrument based on the particular trading product in a futures market. For example, if the quantity available of the derivative financial instrument at a particular price of interest goes below (or, e.g., above) a certain value, then reserved quantity of trading order 12 should decay, e.g., according to the decay rule 66 specified by the trading order 12.

The condition may relate to one or more products identified by, e.g., a process implemented by trading platform 50 (or by, e.g., a trader submitting the trading order 12) as being related (e.g., substantially equivalent) to a particular trading product of a trading order 12.

For example, as described in more detail in U.S. patent application Ser. Nos. 11/399,019 and 11/399,112, both filed on Apr. 5, 2006, and each of which is hereby incorporated by reference herein in its entirety, trading platform 50 may be operable to identify relationships between trading products. Trading products may be related in a number of ways. For example, the historical performance of a ten-year note issued by entity X may be correlated to that of a five-year note issued by entity X. Although they are different trading products, the ten-year note and the five-year note share the same trading entity and are correlated in their performance trends. Thus, a trader who is interested in trading ten-year notes issued by entity X may also be interested in trading five-year notes issued by entity X.

The trading platform 50 may be operable to use current market data to determine a quantity of a particular trading product that may be equivalent to a quantity of a related trading product. For example, trading platform 50 may determine how may five-year notes are equivalent to a number of ten-year notes. Such a calculation may be based on any suitable number and combination of factors such as, for example, the coupons, frequencies, face values, prices, and maturity dates of five-year and ten-year notes.

The trading platform 50 may be operable to determine the liquidity associated with particular trading products. The liquidity associated with a trading product refers to the volume of trading product available for trading in market centers 40. At any given time, the trading platform 50 may determine the available volume of a particular trading product in market centers 40.

Using at least market data from, e.g., the market centers 40, the trading platform 50 may generate a composite value. The composite value may be single value that encompasses the relationships among and the liquidity of multiple trading products in multiple market centers 40. In particular, composite value may represent a quantity, size, or any other measurement of one or more related products that are available for trade in various market centers 40 at any given time. Composite value may be based on any suitable mathematical calculations and/or models for determining relationships among trading products. As an example, composite value may be configured to represent a quantity of "10-year equivalent" fixed income securities available for trade in market centers 40. The quantity of 10-year equivalent securities may encompass the total number of available 10-year notes as well as a weighted quantity of 2-year notes, 3-year notes, 5-year notes, and/or any other suitable number and combination of related trading products. The weighted quantity of related trading products (e.g., 2-year notes, 3-year notes, 5-year notes, etc.) may be incorporated into composite value because that weighted quantity may be considered substantially equivalent (e.g., in performance, yield, price sensitivity to movements in a yield curve, and/or any other suitable number and combination of characteristics) to 10-year notes.

Conditions in decay rules 66 may involve, e.g., relationships between trading products, quantities between related trading products based on a determination that a quantity of a particular trading product may be equivalent to a quantity of a related trading product, liquidity of related trading products in market centers 40, and composite value(s) determined for one or more related trading products.

For example, a condition in a decay rule 66 might involve a trading product that has been determined to be related to a particular trading product of trading order 12. For example, if the quantity available of the related trading product at a particular price of interest goes below (or, e.g., above) a certain value, then reserved quantity of trading order 12 should decay, e.g., according to the decay rule 66 specified by the trading order 12.

The condition may relate to activity external to the particular trading product of a trading order 12. For example, the condition might involve a result of an event seemingly unrelated to the trading product of a trading order 12, such as a result of a sporting event or an election. As an extreme example for illustrative purposes, the condition might involve a time during the trading day. For example, if the time of the day is, e.g., after 3 P.M., and the market is going to close for the day in, say, an hour, a particular decay rule 66 may be operative or, the time may trigger, e.g., a higher decay rate 72 than might be used at other times of the day.

Figure 4:
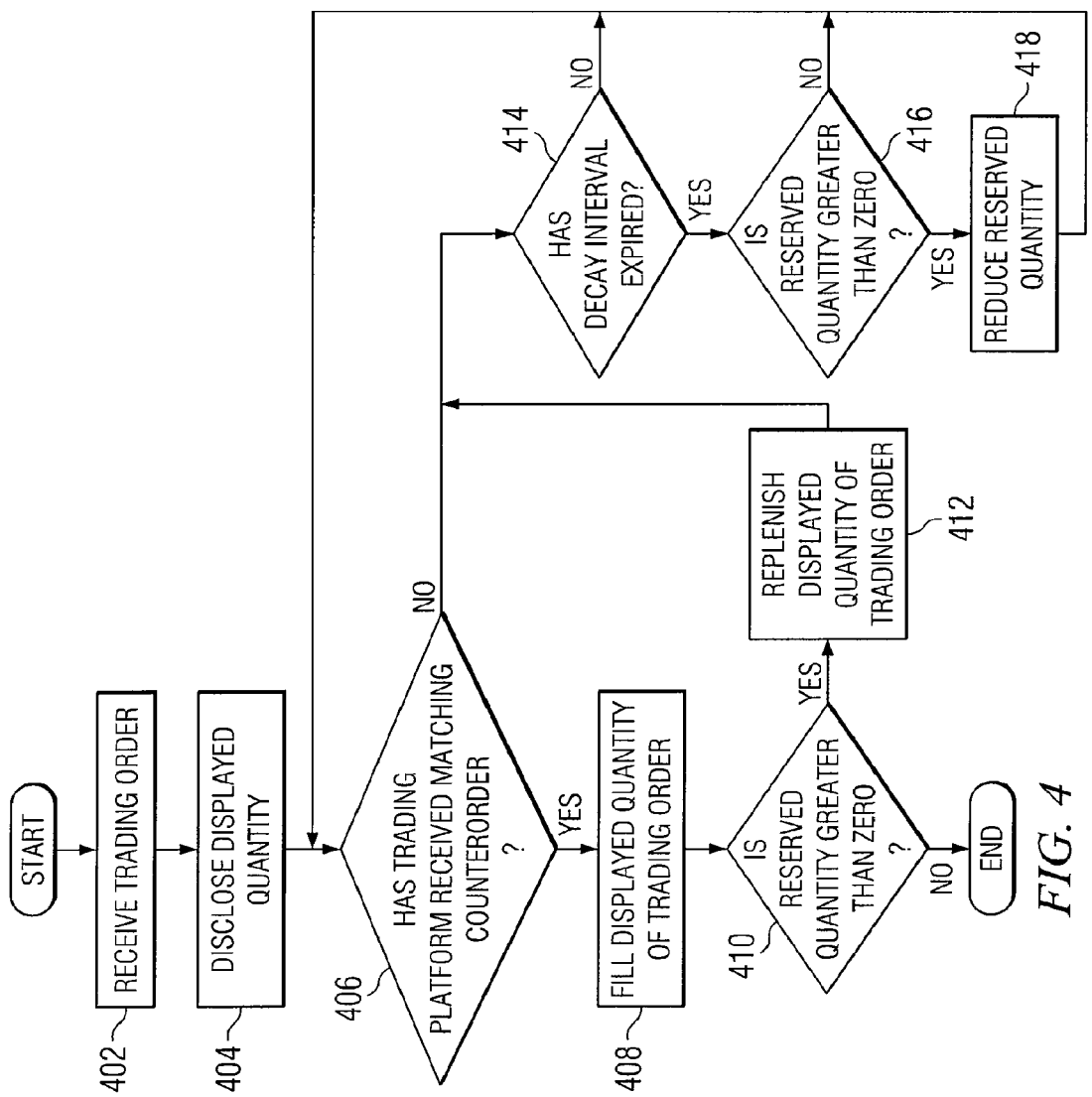
FIG. 4 illustrates a flowchart for managing a trading order with a reserved quantity, according to certain embodiments.

FIG. 4 illustrates a flowchart for managing trading orders 12, according to certain embodiments. The method begins at step 402 where trading platform 50 receives order 12a from client 20. Order 12a may specify, e.g., decay rule 66 as described above. Decay rule 66 may specify decay interval 68 and/or decay rule 72. Order 12a may be for a particular quantity of a trading product. A portion of the particular quantity of order 12a may be designated as a displayed quantity. The remaining portion of the particular quantity of order 12a may be designated as the reserved quantity. At step 404, trading platform 50 discloses the displayed quantity of order 12a to market centers 40. Disclosing the displayed quantity of order 12a may comprise transmitting data regarding the displayed quantity of order 12a to market centers 40.

At step 406, processor 56 determines whether trading platform 50 has received counterorder 12b that matches order 12a. In some embodiments, the determination of whether counterorder 12b matches order 12a is based at least in part on whether counterorder 12b and order 12a are for the same product, the same price, and/or or crossing prices. If processor 56 determines at step 406 that trading platform 50 has not received counterorder 12b that matches order 12a, then the method proceeds to step 414. However, if processor 56 determines at step 406 that trading platform 50 has received counterorder 12b that matches order 12a, then at step 408 processor 56 uses the counterorder 12b to fill the displayed quantity of order 12a. At step 410, processor 56 determines whether the reserved quantity of order 12a is greater than zero. If processor 56 determines at step 410 that the reserved quantity of order 12a is not greater than zero, then the method ends. However, if processor 56 determines at step 410 that the reserved quantity of order 12a is greater than zero, then at step 412 processor 56 uses a portion of the reserved quantity of order 12a to replenish the displayed quantity of order 12a. The method then proceeds to step 414.

At step 414, processor 56 determines whether decay interval 68 associated with decay rule 66 (e.g., stored in memory module 60 and/or specified by trading order 12 as described above) has expired. If processor 56 determines at step 414 that decay interval 68 has not expired, then the method returns to step 406. However, if processor 56 determines at step 414 that decay interval 68 has expired, then at step 416 processor 56 determines whether the reserved quantity of order 12a is greater than zero. If processor 56 determines at step 416 that the reserved quantity is not greater than zero, then the method returns to step 406. However, if processor 56 determines at step 416 that the reserved quantity is greater than zero, then at step 418 processor 56 reduces the reserved quantity of order 12a by a configurable amount according to decay rule 66. Decay rule 66 may comprise any suitable formula, table, algorithm, and/or instructions for reducing the reserved quantity of order 12a over time. Decay rule 66 may specify any suitable length of decay interval 68 and/or may specify any suitable decay rate 72. After processor 56 reduces the reserved quantity of order 12a at step 418, the method returns to step 406. The method ends when, at step 410, processor 56 determines that the reserved quantity of order 12a is not greater than zero. In some embodiments, the method may also end when order 12a expires and/or when trading platform 50 receives a cancel order associated with order 12a.

Further Embodiments

The following should be interpreted as further embodiments and not as claims.

A1. A system, comprising:
  a memory operable to store a trading order for a particular quantity of a trading product, wherein:
    a first portion of the particular quantity is a displayed quantity; and
    a second portion of the particular quantity is a reserved quantity;
  a processor communicatively coupled to the memory and operable to:
    disclose the displayed quantity to one or more market centers;
    identify a decay rate associated with the trading order; and
    cause the reserved quantity to decay based at least in part on the identified decay rate.

A2. The system of A1, wherein:
  the trading order is received at a first time;
  the decay rate is associated with a decay quantity and a time interval; and
  causing the reserved quantity to decay based at least in part on the identified decay rate comprises:
    in response to expiration of the time interval after the first time, subtracting the decay quantity from the reserved quantity; and
    in response to expiration of each successive time interval, subtracting the decay quantity from the reserved quantity such that the reserved quantity decays until the reserved quantity is eliminated.

A3. The system of A1, wherein:
the decay rate is associated with a time interval; and
the decay rate is a variable rate such that, upon expiration of each successive time interval, the reserved quantity diminishes at an increasing rate.

A4. The system of A1, wherein:
the decay rate is associated with a time interval; and
the decay rate is a variable rate such that, upon expiration of each successive time interval, the reserved quantity diminishes at a decreasing rate.

A5. The system of A1, wherein the processor is further operable to:
receive a counterorder for the trading product;
fill the displayed quantity of the trading order with a portion of the counterorder; and
replenish the displayed quantity of the trading order with a portion of the reserved quantity of the trading order.

A6. The system of A5, wherein the displayed quantity of the trading order is replenished independently of the decay of the reserved quantity.

A7. The system of A1, wherein:
the trading order is from a first trader;
the processor is further operable to receive a second trading order for the trading product;
the second trading order comprises a second displayed quantity and a second reserved quantity;
the second trading order is from a second trader; and
the processor is further operable to:
  identify a second decay rate associated with the second trader; and
  cause the second reserved quantity to decay based at least in part on the second decay rate.

A8. The system of A1, wherein:
the decay rate is a first decay rate and the trading product is a first trading product; and
the memory is further operable to storing a plurality of decay rates, wherein each decay rate is associated with a respective trading product.

A9. The system of A1, wherein:
the processor is further operable to record the displayed quantity and the reserved quantity in an order book; and
causing the reserved quantity to decay based at least in part on the identified decay rate comprises:
  in response to expiration of a first time interval, deleting a first portion of the reserved quantity from the order book; and
  in response to expiration of a second time interval, deleting a second portion of the reserved quantity from the order book.

B1. A method, comprising:
receiving a trading order for a particular quantity of a trading product, wherein:
  a first portion of the particular quantity is a displayed quantity; and
  a second portion of the particular quantity is a reserved quantity;
disclosing the displayed quantity to one or more market centers;
identifying a decay rate associated with the trading order; and
causing the reserved quantity to decay based at least in part on the identified decay rate.

B2. The method of B1, wherein:
the trading order is received at a first time;
the decay rate is associated with a decay quantity and a time interval; and
causing the reserved quantity to decay based at least in part on the identified decay rate comprises:
  in response to expiration of the time interval after the first time, subtracting the decay quantity from the reserved quantity; and
  in response to expiration of each successive time interval, subtracting the decay quantity from the reserved quantity such that the reserved quantity decays until the reserved quantity is eliminated.

B3. The method of B1, wherein:
the decay rate is associated with a time interval; and
the decay rate is a variable rate such that, upon expiration of each successive time interval, the reserved quantity diminishes at an increasing rate.

B4. The method of B1, wherein:
the decay rate is associated with a time interval; and
the decay rate is a variable rate such that, upon expiration of each successive time interval, the reserved quantity diminishes at a decreasing rate.

B5. The method of B1, further comprising:
receiving a counterorder for the trading product;
filling the displayed quantity of the trading order with a portion of the counterorder; and
replenishing the displayed quantity of the trading order with a portion of the reserved quantity of the trading order.

B6. The method of B5, wherein the displayed quantity of the trading order is replenished independently of the decay of the reserved quantity.

B7. The method of B1, wherein:
the trading order is from a first trader;
and further comprising:
receiving a second trading order for the trading product, wherein:
  the second trading order comprises a second displayed quantity and a second reserved quantity; and
  the second trading order is from a second trader;
identifying a second decay rate associated with the second trader; and
causing the second reserved quantity to decay based at least in part on the second decay rate.

B8. The method of B1, wherein:
the decay rate is a first decay rate and the trading product is a first trading product;
and further comprising:
storing a plurality of decay rates, wherein each decay rate is associated with a respective trading product.

B9. The method of B1, further comprising:
recording the displayed quantity and the reserved quantity in an order book;
wherein causing the reserved quantity to decay based at least in part on the identified decay rate comprises:
  in response to expiration of a first time interval, deleting a first portion of the reserved quantity from the order book; and
  in response to expiration of a second time interval, deleting a second portion of the reserved quantity from the order book.

C1. Logic encoded in computer-readable media and operable when executed by a processor to:
receive a trading order for a particular quantity of a trading product, wherein:
  a first portion of the particular quantity is a displayed quantity; and
  a second portion of the particular quantity is a reserved quantity;

disclose the displayed quantity to one or more market centers;
identify a decay rate associated with the trading order; and
cause the reserved quantity to decay based at least in part on the identified decay rate.

C2. The logic of C1, wherein:
the trading order is received at a first time;
the decay rate is associated with a decay quantity and a time interval; and
causing the reserved quantity to decay based at least in part on the identified decay rate comprises:
  in response to expiration of the time interval after the first time, subtracting the decay quantity from the reserved quantity; and
  in response to expiration of each successive time interval, subtracting the decay quantity from the reserved quantity such that the reserved quantity decays until the reserved quantity is eliminated.

D1. An apparatus, comprising:
a processor; and
a memory, in which the memory is communicatively coupled to the processor, and in which the memory stores software instructions that, when executed by the processor, cause the processor to:
  receive, from a trader at a first time, a trading order for a particular quantity of a trading product, in which a first portion of the particular quantity is a displayed quantity, and a second portion of the particular quantity is a reserved quantity, and in which the trading order specifies a decay rule;
  identify the decay rule from the trading order, in which the decay rule is associated with at least one of the trader and the trading product, and in which the decay rule specifies at least a variable decay rate and a time interval;
  disclose the displayed quantity of the trading order to one or more market centers;
  receive a counterorder for another particular quantity of the trading product;
  determine that the counterorder matches the trading order;
  fill the displayed quantity of the trading order with at least a portion of the another particular quantity of the counterorder;
  determine that the reserved quantity of the trading order is greater than zero;
  replenish the displayed quantity of the trading order with a portion of the reserved quantity of the trading order, in which a remaining portion of the reserved quantity is left over after replenishing the displayed quantity;
  determine that the time interval after the first time has expired;
  after determining that the time interval after the first time has expired, determine that the remaining portion of the reserved quantity of the trading order is greater than zero;
  reduce the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:
    after determining that the time interval after the first time has expired, reducing the remaining portion of the reserved quantity by a first quantity; and
    increase the variable decay rate; and
    after an expiration of a successive time interval after the time interval, reduce the remaining portion of the reserved quantity by a second quantity, in which the second quantity is larger than the first quantity.

D2. The apparatus of D1, in which the software instructions, when executed by the processor, further cause the processor to:
  receive, from a second trader at a second time, a second trading order for still another particular quantity of the trading product, in which the still another particular quantity of the trading product comprises a second displayed quantity and a second reserved quantity, and in which the second trading order specifies a second decay rule; and
  identify the second decay rule from the second trading order, in which the second decay rule is associated with at least the second trader and the trading product, and in which the second decay rule specifies at least a decay quantity.

D3. The apparatus of D2, in which the second decay rule further specifies at least a second time interval; and in which the software instructions, when executed by the processor, further cause the processor to:
  determine that the second time interval after the second time has expired;
  in response to determining that the second time interval after the second time has expired, subtract the decay quantity from the second reserved quantity; and
  for each second successive time interval until the second reserved quantity is zero, in response to an expiration of the second successive time interval, subtract the decay quantity from the second reserved quantity.

D4. The apparatus of D2, in which the software instructions, when executed by the processor, further cause the processor to:
  cause the second reserved quantity of the second trading order to decay based at least in part on the decay quantity.

D5. The apparatus of D1, in which the software instructions, when executed by the processor, further cause the processor to:
  upon receiving the trading order from the trader, identify the trader;
  identify a trader profile associated with the trader; and
  update another decay rule stored in the trader profile based at least in part on the decay rule from the trading order, in which the decay rule is associated with at least the trader.

D6. The apparatus of D1, in which the software instructions, when executed by the processor, further cause the processor to:
  receive, from a second trader, a second trading order for still another particular quantity of the trading product, in which the still another particular quantity of the trading product comprises a second displayed quantity and a second reserved quantity, and in which the second trading order specifies a second decay rule; and
  identify the second decay rule from the second trading order, in which the second decay rule is associated with at least the second trader and the trading product, and in which the second decay rule specifies at least a second decay rate; and
  cause the second reserved quantity of the second trading order to decay based at least in part on the second decay rate.

D7. The apparatus of D1, in which the variable decay rate is a first decay rate and the trading product is a first trading product of a plurality of trading products; and in which the software instructions, when executed by the processor, further cause the processor to:
 store a plurality of decay rates in the memory, in which each decay rate of the plurality of decay rates is associated with a respective trading product of the plurality of trading products.

D8. The apparatus of D1, in which the software instructions, when executed by the processor, further cause the processor to:
 record at least the reserved quantity of the trading order in an order book; and in which reducing the remaining portion of the reserved quantity by the first quantity comprises:
 deleting the first quantity from the order book; and in which reducing the remaining portion of the reserved quantity by the second quantity comprises:
 deleting the second quantity from the order book.

E1. A method, comprising:
 receiving, from a trader at a first time, by a processor of a computer, a trading order for a particular quantity of a trading product, in which a first portion of the particular quantity is a displayed quantity, and a second portion of the particular quantity is a reserved quantity, and in which the trading order specifies a decay rule;
 identifying, by the processor, the decay rule from the trading order, in which the decay rule is associated with at least one of the trader and the trading product, and in which the decay rule specifies at least a variable decay rate and a time interval;
 disclosing, by the processor, the displayed quantity of the trading order to one or more market centers;
 receiving, by the processor, a counterorder for another particular quantity of the trading product;
 determining, by the processor, that the counterorder matches the trading order;
 filling, by the processor, the displayed quantity of the trading order with at least a portion of the another particular quantity of the counterorder;
 determining, by the processor, that the reserved quantity of the trading order is greater than zero;
 replenishing, by the processor, the displayed quantity of the trading order with a portion of the reserved quantity of the trading order, in which a remaining portion of the reserved quantity is left over after replenishing the displayed quantity;
 determining, by the processor, that the time interval after the first time has expired;
 after determining that the time interval after the first time has expired, determining, by the processor, that the remaining portion of the reserved quantity of the trading order is greater than zero;
 reducing, by the processor, the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:
 after determining that the time interval after the first time has expired, reducing, by the processor, the remaining portion of the reserved quantity by a first quantity; and
 increasing, by the processor, the variable decay rate; and
 after an expiration of a successive time interval after the time interval, reducing, by the processor, the remaining portion of the reserved quantity by a second quantity, in which the second quantity is larger than the first quantity.

E2. The method of E1, further comprising:
 receive, by the processor, from a second trader at a second time, a second trading order for still another particular quantity of the trading product, in which the still another particular quantity of the trading product comprises a second displayed quantity and a second reserved quantity, and in which the second trading order specifies a second decay rule; and
 identifying, by the processor, the second decay rule from the second trading order, in which the second decay rule is associated with at least the second trader and the trading product, and in which the second decay rule specifies at least a decay quantity.

E3. The method of E2, in which the second decay rule further specifies at least a second time interval; and in which the method further comprises:
 determining, by the processor, that the second time interval after the second time has expired;
 in response to determining that the second time interval after the second time has expired, subtracting, by the processor, the decay quantity from the second reserved quantity; and
 for each second successive time interval until the second reserved quantity is zero, in response to an expiration of the second successive time interval, subtracting, by the processor. the decay quantity from the second reserved quantity.

E4. The method of E2, further comprising:
 causing, by the processor, the second reserved quantity of the second trading order to decay based at least in part on the decay quantity.

E5. The method of E1, further comprising:
 upon receiving the trading order from the trader, identifying, by the processor, the trader;
 identifying, by the processor, a trader profile associated with the trader; and
 updating, by the processor, another decay rule stored in the trader profile based at least in part on the decay rule from the trading order, in which the decay rule is associated with at least the trader.

E6. The method of E1, further comprising:
 receiving, by the processor, from a second trader, a second trading order for still another particular quantity of the trading product, in which the still another particular quantity of the trading product comprises a second displayed quantity and a second reserved quantity, and in which the second trading order specifies a second decay rule;
 identifying, by the processor, the second decay rule from the second trading order, in which the second decay rule is associated with at least the second trader and the trading product, and in which the second decay rule specifies at least a second decay rate; and
 causing, by the processor, the second reserved quantity of the trading order to decay based at least in part on the second decay rate.

E7. The method of E1, in which the variable decay rate is a first decay rate and the trading product is a first trading product of a plurality of trading products; and in which the method further comprises:
 storing, by the processor, a plurality of decay rates, in which each decay rate of the plurality of decay rates is associated with a respective trading product of the plurality of trading products.

E8. The method of E1, further comprising:
 recording, by the processor, at least the reserved quantity of the trading order in an order book; and in which reducing the remaining portion of the reserved quantity by the first quantity comprises:
 deleting, by the processor, the first quantity from the order book; and
 deleting, by the processor, the second quantity from the order book.

F1. A computer-readable medium, the computer-readable medium being a tangible medium, the computer-readable medium storing software instructions that, when executed by a processor, cause the processor to:
 receive, from a trader at a first time, a trading order for a particular quantity of a trading product, in which a first portion of the particular quantity is a displayed quantity, and a second portion of the particular quantity is a reserved quantity, and in which the trading order specifies a decay rule;
 identify the decay rule from the trading order, in which the decay rule is associated with at least one of the trader and the trading product, and in which the decay rule specifies at least a variable decay rate and a time interval;
 disclose the displayed quantity of the trading order to one or more market centers;
 receive a counterorder for another particular quantity of the trading product;
 determine that the counterorder matches the trading order;
 fill the displayed quantity of the trading order with at least a portion of the another particular quantity of the counterorder;
 determine that the reserved quantity of the trading order is greater than zero;
 replenish the displayed quantity of the trading order with a portion of the reserved quantity of the trading order, in which a remaining portion of the reserved quantity is left over after replenishing the displayed quantity;
 determine that the time interval after the first time has expired;
 after determining that the time interval after the first time has expired, determine that the remaining portion of the reserved quantity of the trading order is greater than zero;
 reduce the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:
  after determining that the time interval after the first time has expired, reducing the remaining portion of the reserved quantity by a first quantity; and
  increase the variable decay rate; and
 after an expiration of a successive time interval after the time interval, reduce the remaining portion of the reserved quantity by a second quantity, in which the second quantity is larger than the first quantity.

F2. The computer-readable medium of F1, in which the software instructions, when executed by the processor, further cause the processor to:
 receive, from a second trader at a second time, a second trading order for still another particular quantity of the trading product, in which the still another particular quantity of the trading product comprises a second displayed quantity and a second reserved quantity, and in which the second trading order specifies a second decay rule; and
 identify the second decay rule from the second trading order, in which the second decay rule is associated with at least the second trader and the trading product, and in which the second decay rule specifies at least a decay quantity.

F3. The computer-readable medium of F2, in which the second decay rule further specifies at least a second time interval; and in which the software instructions, when executed by the processor, further cause the processor to:
 determine that the second time interval after the second time has expired;
 in response to determining that the second time interval after the second time has expired, subtract the decay quantity from the second reserved quantity; and
 for each second successive time interval until the second reserved quantity is zero, in response to an expiration of the second successive time interval, subtract the decay quantity from the second reserved quantity.

F4. The computer-readable medium of F2, in which the software instructions, when executed by the processor, further cause the processor to:
 cause the second reserved quantity of the second trading order to decay based at least in part on the decay quantity.

F5. The computer-readable medium of F1, in which the software instructions, when executed by the processor, further cause the processor to:
 upon receiving the trading order from the trader, identify the trader;
 identify a trader profile associated with the trader; and
 update another decay rule stored in the trader profile based at least in part on the decay rule from the trading order, in which the decay rule is associated with at least the trader.

F6. The computer-readable medium of F1, in which the software instructions, when executed by the processor, further cause the processor to:
 receive, from a second trader, a second trading order for still another particular quantity of the trading product, in which the still another particular quantity of the trading product comprises a second displayed quantity and a second reserved quantity, and in which the second trading order specifies a second decay rule; and
 identify the second decay rule from the second trading order, in which the second decay rule is associated with at least the second trader and the trading product, and in which the second decay rule specifies at least a second decay rate; and
 cause the second reserved quantity of the second trading order to decay based at least in part on the second decay rate.

F7. The computer-readable medium of F1, in which the variable decay rate is a first decay rate and the trading product is a first trading product of a plurality of trading products; and in which the software instructions, when executed by the processor, further cause the processor to:
store a plurality of decay rates in a memory, in which each decay rate of the plurality of decay rates is associated with a respective trading product of the plurality of trading products.

F8. The computer-readable medium of F1, in which the software instructions, when executed by the processor, further cause the processor to:
record at least the reserved quantity of the trading order in an order book; and in which reducing the remaining portion of the reserved quantity by the first quantity comprises:
deleting the first quantity from the order book; and in which reducing the remaining portion of the reserved quantity by the second quantity comprises:
deleting the second quantity from the order book.

G1. An apparatus, comprising:
a processor; and
a memory, in which the memory is communicatively coupled to the processor, and in which the memory stores software instructions that, when executed by the processor, cause the processor to:
receive, from a trader at a first time, a trading order for a particular quantity of a trading product, in which a first portion of the particular quantity is a displayed quantity, and a second portion of the particular quantity is a reserved quantity, and in which the trading order specifies a decay rule;
identify the decay rule from the trading order, in which the decay rule is associated with at least one of the trader and the trading product, and in which the decay rule specifies at least a variable decay rate and a time interval;
disclose the displayed quantity of the trading order to one or more market centers;
determine that the time interval after the first time has expired;
after determining that the time interval after the first time has expired, determine that the reserved quantity of the trading order is greater than zero; and
reduce the reserved quantity in accordance with the variable decay rate without changing the displayed quantity of the trading order, in which reducing the reserved quantity in accordance with the variable decay rate comprises:
after determining that the time interval after the first time has expired, reducing the reserved quantity by a first quantity; and
increase the variable decay rate; and
after an expiration of a successive time interval after the time interval, reduce the reserved quantity by a second quantity, in which the second quantity is larger than the first quantity.

H1. A method, comprising:
receiving, from a trader at a first time, by a processor of a computer, a trading order for a particular quantity of a trading product, in which a first portion of the particular quantity is a displayed quantity, and a second portion of the particular quantity is a reserved quantity, and in which the trading order specifies a decay rule;
identifying, by the processor, the decay rule from the trading order, in which the decay rule is associated with at least one of the trader and the trading product, and in which the decay rule specifies at least a variable decay rate and a time interval;
disclosing, by the processor, the displayed quantity of the trading order to one or more market centers;
determining, by the processor, that the time interval after the first time has expired;
after determining that the time interval after the first time has expired, determining, by the processor, that the reserved quantity of the trading order is greater than zero; and
reducing, by the processor, the reserved quantity in accordance with the variable decay rate without changing the displayed quantity of the trading order, in which reducing the reserved quantity in accordance with the variable decay rate comprises;
after determining that the time interval after the first time has expired, reducing, by the processor, the reserved quantity by a first quantity; and
increasing, by the processor, the variable decay rate; and
after an expiration of a successive time interval after the time interval, reducing, by the processor, the reserved quantity by a second quantity, in which the second quantity is larger than the first quantity.

I1. A computer-readable medium, the computer-readable medium being a tangible medium, the computer-readable medium storing software instructions that, when executed by a processor, cause the processor to:
receive, from a trader at a first time, a trading order for a particular quantity of a trading product, in which a first portion of the particular quantity is a displayed quantity, and a second portion of the particular quantity is a reserved quantity, and in which the trading order specifies a decay rule;
identify the decay rule from the trading order, in which the decay rule is associated with at least one of the trader and the trading product, and in which the decay rule specifies at least a variable decay rate and a time interval;
disclose the displayed quantity of the trading order to one or more market centers;
determine that the time interval after the first time has expired;
after determining that the time interval after the first time has expired, determine that the reserved quantity of the trading order is greater than zero; and
reduce the reserved quantity in accordance with the variable decay rate without changing the displayed quantity of the trading order, in which reducing the reserved quantity in accordance with the variable decay rate comprises;
after determining that the time interval after the first time has expired, reducing the reserved quantity by a first quantity; and
increase the variable decay rate; and
after an expiration of a successive time interval after the time interval, reduce the reserved quantity by a second quantity, in which the second quantity is larger than the first quantity.

J1. An apparatus, comprising:
a processor; and
a memory, in which the memory is communicatively coupled to the processor, and in which the memory stores software instructions that, when executed by the processor, cause the processor to:
receive, from a trader at a first time, a trading order for a particular quantity of a trading product, in which a first portion of the particular quantity is a displayed quantity, and a second portion of the particular quantity is a reserved quantity, and in which the trading order specifies a decay rule;

identify the decay rule from the trading order, in which the decay rule is associated with at least one of the trader and the trading product, and in which the decay rule specifies at least a variable decay rate and a time interval;

disclose the displayed quantity of the trading order to one or more market centers;

receive a counterorder for another particular quantity of the trading product;

determine that the counterorder matches the trading order;

fill the displayed quantity of the trading order with at least a portion of the another particular quantity of the counterorder;

determine that the reserved quantity of the trading order is greater than zero;

replenish the displayed quantity of the trading order with a portion of the reserved quantity of the trading order, in which a remaining portion of the reserved quantity is left over after replenishing the displayed quantity;

determine that the time interval after the first time has expired;

after determining that the time interval after the first time has expired, determine that the remaining portion of the reserved quantity of the trading order is greater than zero;

reduce the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:

after determining that the time interval after the first time has expired, reducing the remaining portion of the reserved quantity by a first quantity; and decreasing the variable decay rate; and after an expiration of a successive time interval after the time interval, reduce the remaining portion of the reserved quantity by a second quantity, in which the second quantity is smaller than the first quantity.

K1. A method, comprising:

receiving, from a trader at a first time, by a processor of a computer, a trading order for a particular quantity of a trading product, in which a first portion of the particular quantity is a displayed quantity, and a second portion of the particular quantity is a reserved quantity, and in which the trading order specifies a decay rule;

identifying, by the processor, the decay rule from the trading order, in which the decay rule is associated with at least one of the trader and the trading product, and in which the decay rule specifies at least a variable decay rate and a time interval;

disclosing, by the processor, the displayed quantity of the trading order to one or more market centers;

receiving, by the processor, a counterorder for another particular quantity of the trading product;

determining, by the processor, that the counterorder matches the trading order;

filling, by the processor, the displayed quantity of the trading order with at least a portion of the another particular quantity of the counterorder;

determining, by the processor, that the reserved quantity of the trading order is greater than zero;

replenishing, by the processor, the displayed quantity of the trading order with a portion of the reserved quantity of the trading order, in which a remaining portion of the reserved quantity is left over after replenishing the displayed quantity;

determining, by the processor, that the time interval after the first time has expired;

after determining that the time interval after the first time has expired, determining, by the processor, that the remaining portion of the reserved quantity of the trading order is greater than zero;

reducing, by the processor, the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:

after determining that the time interval after the first time has expired, reducing, by the processor, the remaining portion of the reserved quantity by a first quantity; and decreasing, by the processor, the variable decay rate; and after expiration of a successive time interval after the time interval, reducing, by the processor, the remaining portion of the reserved quantity by a second quantity, in which the second quantity is smaller than the first quantity.

L1. A computer-readable medium, the computer-readable medium being a tangible medium, the computer-readable medium storing software instructions that, when executed by a processor, cause the processor to:

receive, from a trader at a first time, a trading order for a particular quantity of a trading product, in which a first portion of the particular quantity is a displayed quantity, and a second portion of the particular quantity is a reserved quantity, and in which the trading order specifies a decay rule;

identify the decay rule from the trading order, in which the decay rule is associated with at least one of the trader and the trading product, and in which the decay rule specifies at least a variable decay rate and a time interval;

disclose the displayed quantity of the trading order to one or more market centers;

receive a counterorder for another particular quantity of the trading product;

determine that the counterorder matches the trading order;

fill the displayed quantity of the trading order with at least a portion of the another particular quantity of the counterorder;

determine that the reserved quantity of the trading order is greater than zero;

replenish the displayed quantity of the trading order with a portion of the reserved quantity of the trading order, in which a remaining portion of the reserved quantity is left over after replenishing the displayed quantity;

determine that the time interval after the first time has expired;

after determining that the time interval after the first time has expired, determine that the remaining portion of the reserved quantity of the trading order is greater than zero;

reduce the remaining portion of the reserved quantity in accordance with the decay rule, in which any replenishing of the displayed quantity of the trading order occurs independently of reducing the remaining portion of the reserved quantity in accordance with the decay rule, and in which reducing the remaining portion of the reserved quantity in accordance with the decay rule comprises:

after determining that the time interval after the first time has expired, reducing the remaining portion of the reserved quantity by a first quantity; and decrease the variable decay rate; and after an expiration of a successive time interval after the time interval, reduce the remaining portion of the reserved quantity by a second quantity, in which the second quantity is smaller than the first quantity.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An apparatus, comprising:

a memory operable to store a trading order for a particular quantity of a trading product, in which a first portion of the particular quantity is a displayed quantity, and a second portion of the particular quantity is a reserved quantity;

a processor communicatively coupled to the memory and operable to:

receive the trading order from a trader;

identify a decay rule stored in the trading order, in which the decay role is associated with at least one of the trader and the trading product, and in which the decay rule specifies at least two of a decay rate, a time interval, and a decay quantity;

disclose the displayed quantity of the trading order to one or more market centers;

receive a counterorder for another particular quantity of the trading product;

determine that the counterorder matches the trading order;

fill the displayed quantity of the trading order with at least a portion of the another particular quantity of the counterorder;

determine that the reserved quantity of the trading order is greater than zero;

replenish the displayed quantity of the trading order with a portion of the reserved quantity of the trading order, in which a remaining portion of the reserved quantity is left over after replenishing the displayed quantity;

determine that the remaining portion of the reserved quantity of the trading order is greater than zero; and reduce the remaining portion of the reserved quantity in accordance with the decay rule, in which any replenishing of the displayed quantity of the trading order occurs independently of reducing the remaining portion of the reserved quantity in accordance with the decay rule.

2. The apparatus of claim 1, in which the decay rule specifies at least the that, upon expiration of each successive time interval after the time interval expires, the remaining portion of the reserved quantity diminishes at one of a decreasing rate and an increasing rate.

3. The apparatus of claim 1, in which the processor is further operable to:

upon receiving the trading order from the trader, identify the trader;

identify a trader profile associated with the trader, in which the trader profile is stored in the memory; and update another decay role stored in the trader profile based at least in part on The decay rule from the trading order, in which the decay rule is associated with at least the trader.

4. The apparatus of claim 1, the processor is further operable to:

receive, from a second trader, a second trading order for still another particular quantity of the trading product, in which the still another particular quantity of the trading product comprises a second displayed quantity and a second reserved quantity; and identify a second decay rule stored in the second trading order, in which the second decay rule is associated with at least the second trader and the trading product, and in which the second decay rule specifies a second decay rate and at least one of a second time interval and a second decay quantity; and cause the second reserved quantity of the second trading order to decay based at least in part on the second decay rate.

5. The apparatus of claim 1, in which the decay rule specifies at least the decay rate;

in which the decay rate is a first decay rate and the trading product is a first trading product of a plurality of trading products; and in which the memory is further operable to store a plurality of decay rates, in which each decay rate of the plurality of decay rates is associated with a respective trading product of the plurality of trading products.

6. The apparatus of claim 1, in which the processor is further operable to:

record the displayed quantity of the trading order and the reserved quantity of the trading order in an order book; and in which the decay role specifies the time interval, a second time interval, and the decay rate;

and in which reducing the remaining portion of the reserved quantity in accordance with the decay rule comprises:

in response to an expiration of the time interval, deleting a first portion of the reserved quantity from the order book; and in response to an expiration of the second time interval, deleting a second portion of the reserved quantity from the order book.

7. The apparatus of claim 1, in which receiving the trading order from the trader comprises:

receiving the trading order from the trader at a first time; and in which the processor is further operable to:

prior to determining that the remaining portion of the reserved quantity of the trading order is greater than zero, determine that the time interval after the first time has expired.

8. The apparatus of claim 7, in which the decay role specifies at least the time interval and the decay quantity; and in which reducing the remaining portion of the reserved quantity in accordance with the decay rule comprises:

in response to determining that the time interval has expired after the first time, subtracting the decay quantity from the remaining portion of the reserved quantity; and for each successive time interval until the remaining portion of the reserved quantity is zero, in response to an expiration of the successive time interval, subtracting the decay quantity from the remaining portion of the reserved quantity.

9. The apparatus of claim 7, in which the decay rule specifies at least the decay rate and the time interval, and in which the decay rate is a variable decay rate; and in which reducing the remaining portion of the reserved quantity in accordance with the decay rule comprises:

upon determining that the time interval has expired after the first time, reducing the remaining portion of the reserved quantity by a first quantity; and in which the processor is further operable to:
increase the variable decay rate; and
upon an expiration of a successive time interval after the time interval, reduce the remaining portion of the reserved quantity by a second quantity, in which the second quantity is larger than the first quantity.

10. The apparatus of claim 7, in which the decay rule specifies at least the decay rate and the time interval, and
in which the decay rate is a variable decay rate; and in which reducing the remaining portion of the reserved quantity in accordance with the decay rule comprises:
upon determining that the time interval has expired after the first time, reducing the remaining portion of the reserved quantity by a first quantity; and in which the processor is further operable to:
decrease the variable decay rate; and
upon an expiration of a successive time interval after the time interval, reduce the remaining portion of the reserved quantity by a second quantity, in which the second quantity is smaller than the first quantity.

11. A method, comprising:
receiving, by a processor of a computer, a trading order from a trader, in which the trading order is for a particular quantity of a trading product, in which a first portion of the particular quantity is a displayed quantity, and a second portion of the particular quantity is a reserved quantity;
identifying, by the processor, a decay rule stored in the trading order, in which the decay rule is associated with at least one of the trader and the trading product, and in which the decay rule specifies at least two of a decay rate, a time interval, and a decay quantity;
disclosing, by the processor, the displayed quantity of the trading order to one or more market centers;
receiving, by the processor, a counterorder for another particular quantity of the trading product;
determining, by the processor, that the counterorder matches the trading order;
filling, by the processor, the displayed quantity of the trading order with at least a portion of the another particular quantity of the counterorder;
determining, by the processor, that the reserved quantity of the trading order is greater than zero;
replenishing, by the processor, the displayed quantity of the trading order with a portion of the reserved quantity of the trading order, in which a remaining portion of the reserved quantity is left over after replenishing the displayed quantity;
determining, by the processor, that the remaining portion of the reserved quantity of the trading order is greater than zero; and
reducing, by the processor, the remaining portion of the reserved quantity in accordance with the decay role, in which any replenishing of the displayed quantity of the trading order occurs independently of reducing the remaining portion of the reserved quantity in accordance with the decay rule.

12. The method of claim 11, in which the decay rule specifies at least the decay rate and the time interval; and in which the decay rate is a variable rate such that, upon expiration of each successive time interval after the time interval expires, the remaining portion of the reserved quantity diminishes at one of a decreasing rate and an increasing rate.

13. The method of claim 11, further comprising:
upon receiving the trading order from the trader, identifying, by the processor, the trader;
identifying, by the processor, a trader profile associated with the trader; and
updating, by the processor, another decay rule stored in the trader profile based at least in part on the decay rule from the trading order, in which the decay rule is associated with at least the trader.

14. The method of claim 11, further comprising:
receiving, by the processor, from a second trader, a second trading order for still another particular quantity of the trading product, in which the still another particular quantity of the trading product comprises a second displayed quantity and a second reserved quantity;
identifying, by the processor, a second decay role stored in the second trading order, in which the second decay rule is associated with the second trader and the trading product, and in which the second decay rule specifies a second decay rate and at least one of a second time interval and a second decay quantity; and
causing, by the processor, the second reserved quantity of the trading order to decay based at least in part on the second decay rate.

15. The method of claim 11, in which the decay rule specifies at least the decay rate;
in which the decay rate is a first decay rate and the trading product is a first trading product of a plurality of trading products; and
in which the method further comprises:
storing, by the processor, a plurality of decay rates, in which each decay rate is associated with a respective trading product of the plurality of trading products.

16. The method of claim 11, further comprising:
recording, by the processor, the displayed quantity of the trading order and the reserved quantity of the trading order in an order book; and in which the decay rule specifies the time interval, a second time interval, and the decay rate;
and in which reducing the remaining portion of the reserved quantity in accordance with the decay rule comprises:
in response to an expiration of the time interval, deleting, by the processor, a first portion of the reserved quantity from the order book; and
in response to an expiration of the second time interval, deleting, by the processor, a second portion of the reserved quantity from the order book.

17. The method of claim 11, in which receiving the trading order from the trader comprises:
receiving the trading order from the trader at a first time; and
in which the method further comprises:
prior to determining that the remaining portion of the reserved quantity of the trading order is greater than zero, determine, by the processor, that the time interval after the first time has expired.

18. The method of claim 17, in which the decay role specifies at least the time interval and the decay quantity; and
in which reducing the remaining portion of the reserved quantity in accordance with the decay rule comprises:
in response to determining that the time interval has expired after the first time, subtracting, by the processor, the decay quantity from the remaining portion of the reserved quantity; and
for each successive time interval until the remaining portion of the reserved quantity is zero, in response to an expiration of the successive time interval, subtracting, by the processor, the decay quantity from the remaining portion of the reserved quantity.

19. The method of claim 17, in which the decay rule specifies at least the decay rate and the time interval, and
in which the decay rate is a variable decay rate; and in which reducing the remaining portion of the reserved quantity in accordance with the decay rule comprises:
upon determining that the time interval has expired after the first time, reducing, by the processor, the remaining portion of the reserved quantity by a first quantity; and in which the method further comprises:
increasing, by the processor, the variable decay rate; and
upon an expiration of a successive time interval after the time interval, reducing, by the processor, the remaining portion of the reserved quantity by a second quantity, in which the second quantity is larger than the first quantity.

20. The method of claim 17, in which the decay rule specifies at least the decay rate and the time interval, and in which the decay rate is a variable decay rate; and
in which reducing the remaining portion of the reserved quantity in accordance with the decay rule comprises:
upon determining that the time interval has expired after the first time, reducing, by the processor, the remaining portion of the reserved quantity by a first quantity; and in which the method further comprises:
decreasing, by the processor, the variable decay rate; and
upon an expiration of a successive time interval after the time interval, reducing, by the processor, the remaining portion of the reserved quantity by a second quantity, in which the second quantity is smaller than the first quantity.

21. A computer-readable medium, the computer-readable medium being a tangible medium, the computer-readable medium storing software instructions that when executed by a processor cause the processor to:
receive a trading order from a trader, in which the trading order is for a particular quantity of a trading product, in which a first portion of the particular quantity is a displayed quantity, and a second portion of the particular quantity is a reserved quantity;
identify a decay rule stored in the trading order, in which the decay rule is associated with at least one of the trader and the trading product, and in which the decay rule specifies at least two of a decay rate, a time interval, and a decay quantity;
disclose the displayed quantity of the trading order to one or more market centers;
receive a counterorder for another particular quantity of the trading product; determine that the counterorder matches the trading order;
fill the displayed quantity of the trading order with at least a portion of the another particular quantity of the counterorder;
determine that the reserved quantity of the trading order is greater than zero;
replenish the displayed quantity of the trading order with a portion of the reserved quantity of the trading order, in which a remaining portion of the reserved quantity is left over after replenishing the displayed quantity;
determine that the remaining portion of the reserved quantity of the trading order is greater than zero; and
reduce the remaining portion of the reserved quantity in accordance with the decay rule, in which any replenishing of the displayed quantity of the trading order occurs independently of reducing the remaining portion of the reserved quantity in accordance with the decay rule.

22. The computer-readable medium of claim 21, in which the decay role specifies at least the decay rate and the time interval; and in which the decay rate is a variable rate such that, upon expiration of each successive time interval after the time interval expires, the remaining portion of the reserved quantity diminishes at one of a decreasing rate and an increasing rate.

23. The computer-readable medium of claim 21, in which the software instructions, when executed by the processor, further cause the processor to: upon receiving the trading order from the trader, identify the trader; identify a trader profile associated with the trader; and update another decay rule stored in the trader profile based at least in part on the decay rule from the trading order, in which the decay rule is associated with at least the trader.

24. The computer-readable medium of claim 21, in which the software instructions, when executed by the processor, further cause the processor to:
receive, from a second trader, a second trading order for still another particular quantity of the trading product, in which the still another particular quantity of the trading product comprises a second displayed quantity and a second reserved quantity; and
identify a second decay rule stored in the second trading order, in which the second decay rule is associated with at least the second trader and the trading product, and in which the second decay rule specifies a second decay rate and at least one of a second time interval and a second decay quantity; and
cause the second reserved quantity of the second trading order to decay based at least in part on the second decay rate.

25. The computer-readable medium of claim 21, in which the software instructions, when executed by the processor, further cause the processor to:
record the displayed quantity of the trading order and the reserved quantity of the trading order in an order book; and in which the decay role specifies the time interval, a second time interval, and the decay rate;
and in which reducing the remaining portion of the reserved quantity in accordance with the decay role comprises:
in response to an expiration of the time interval, deleting a first portion of the reserved quantity from the order book; and
in response to an expiration of the second time interval, deleting a second portion of the reserved quantity from the order book.

26. The computer-readable medium of claim 21, in which receiving the trading order from the trader comprises:
receiving the trading order from the trader at a first time; and
in which the software instructions, when executed by the processor, further cause the processor to:
prior to determining that the remaining portion of the reserved quantity of the trading order is greater than zero, determine that the time interval after the first time has expired.

27. The computer-readable medium of claim 26, in which the decay role specifies at least the time interval and the decay quantity; and in which reducing the remaining portion of the reserved quantity in accordance with the decay rule comprises:
in response to determining that the time interval has expired after the first time, subtracting the decay quantity from the remaining portion of the reserved quantity; and for each successive time interval until the remaining portion of the reserved quantity is zero, in response to an expiration of the successive time interval, subtracting the decay quantity from the remaining portion of the reserved quantity.

28. The computer-readable medium of claim 26, in which the decay rule specifies at least the decay rate and the time interval, and in which the decay rate is a variable decay rate; and in which reducing the remaining portion of the reserved quantity in accordance with the decay rule comprises:
    upon determining that the time interval has expired after the first time,
    reducing the remaining portion of the reserved quantity by a first quantity; and in which the processor is further operable to:
    increase the variable decay rate; and
    upon an expiration of a successive time interval after the time interval, reduce the remaining portion of the reserved quantity by a second quantity, in which the second quantity is larger than the first quantity.

29. The computer-readable medium of claim 26, in which the decay rule specifies at least the decay rate and the time interval, and in which the decay rate is a variable decay rate; and in which reducing the remaining portion of the reserved quantity in accordance with the decay rule comprises:
    upon determining that the time interval has expired after the first time, reducing the remaining portion of the reserved quantity by a first quantity; and in which the processor is further operable to:
    decrease the variable decay rate; and
    upon an expiration of a successive time interval after the time interval, reduce the remaining portion of the reserved quantity by a second quantity, in which the second quantity is smaller than the first quantity.

\* \* \* \* \*